United States Patent [19]

Volk, Jr.

[11] Patent Number: 4,929,163
[45] Date of Patent: May 29, 1990

[54] APPARATUS FOR A PELLET MILL WITHOUT STEAM ADDITION

[75] Inventor: Joseph A. Volk, Jr., Creve Coeur, Mo.

[73] Assignee: Beta Raven, Inc., Earth City, Mo.

[21] Appl. No.: 172,755

[22] Filed: Mar. 28, 1988

[51] Int. Cl.⁵ ............................................. B29B 13/02
[52] U.S. Cl. .................... 425/143; 364/557;
425/308; 425/331; 425/DIG. 230; 425/DIG. 245; 426/454
[58] Field of Search ............. 425/DIG. 230, 331, 143, 425/144, 307, 308, 141, DIG. 245; 426/454; 364/557

[56] References Cited

U.S. PATENT DOCUMENTS

| | | | |
|---|---|---|---|
| 1,185,622 | 6/1916 | Boss | 426/511 |
| 3,181,482 | 5/1965 | Heth et al. | 425/DIG. 230 |
| 3,932,736 | 1/1976 | Zarow et al. | 425/DIG. 230 |
| 4,001,452 | 1/1977 | Williams | 426/454 |
| 4,024,288 | 5/1977 | Witte | 426/511 |
| 4,080,134 | 3/1978 | Klaeysen et al. | 425/DIG. 30 |
| 4,163,469 | 8/1979 | English | 425/DIG. 30 |
| 4,340,937 | 7/1982 | Volk, Jr. | 425/DIG. 30 |
| 4,463,430 | 7/1984 | Volk, Jr. et al. | 425/DIG. 30 |
| 4,659,299 | 4/1987 | Pierik | 425/DIG. 30 |
| 4,667,418 | 5/1987 | White | 426/623 |
| 4,700,310 | 10/1987 | Volk, Jr. | 426/454 |
| 4,721,448 | 1/1988 | Irish et al. | 425/DIG. 30 |

*Primary Examiner*—Virginia Manoharan
*Attorney, Agent, or Firm*—Rogers, Howell & Haferkamp

[57] ABSTRACT

A pellet mill includes a conditioning section which mixes dry material, moisture in the form of water, and heat provided by a hot air system for the creation of a mash suitable for pelleting without the use of steam. The hot air section inputs heat by utilizing a blower which pressurizes air across a heat exchanger and into a plenum which interconnects an air duct with the conditioner. Moisture is input to the conditioner with a hot water system which modulates the flow of water and temperature of the water as it is sprayed onto the dry material. An automatic controller controls the process in accordance with temperature measurements made at various points in the pellet mill to select a desired operating temperature or in accordance with other control parameters previously developed.

10 Claims, 1 Drawing Sheet

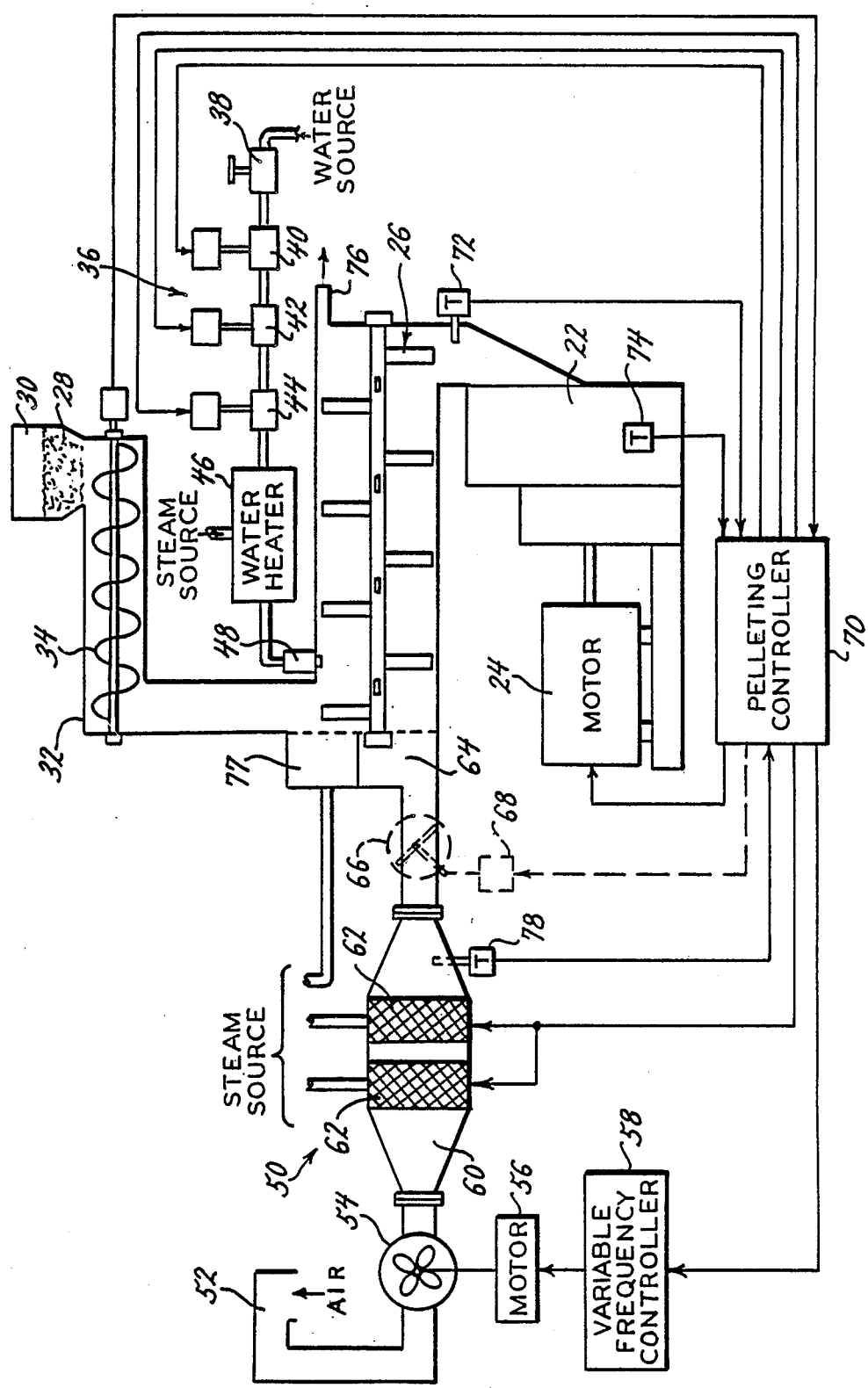

APPARATUS FOR A PELLET MILL WITHOUT STEAM ADDITION

BACKGROUND AND SUMMARY OF THE INVENTION

The pelleting process has been known for years and generally includes the mixing of dry feed material with moisture and heat to form a mash, and then forcing the mash through the holes in a rotating die. A set of stationary knives is oriented to trim the extruded mash as the die rotates to then form the pellets. Almost universally in the prior art, pelleting systems utilized steam in the mixing or conditioning portion of the process. This is generally considered by those of ordinary skill in the art as necessary in order to fully and completely heat the dry material, add appropriate amounts of moisture, and ensure a complete mixing of the ingredients in the conditioner to form a homogenous mash before it is pelleted. One of the principal advantages of utilizing steam is that the steam changes phase within the conditioner and thereby contributes its heat of vaporization as it condenses into liquid water to thereby provide an added amount of heat to the mash. Heating is important for many processes and formulations as the pellet mill may be operated at quite elevated temperatures. It is not uncommon to operate the pellet mill with mash temperatures approaching and even exceeding 180° F. At elevated throughput rates and low ambient temperatures (such as in the winter), quite significant amounts of heat are required to ensure that the mash temperature is elevated to a proper value. Therefore, virtually every pellet mill installation and process includes the use of steam in the conditioner as a source of both heat and moisture in transforming the dry feed material into a mash suitable for pelleting in the rotating die.

One of the most important parameters utilized to control the pelleting process and also to judge the quality of a finished pellet is the amount of moisture utilized in the pelleting process and the percentage of moisture contained in the finished pellet. The inventor herein is also the inventor of the following patents disclosing and claiming automatic control systems for pellet mills and various features thereof: U.S. Pat. Nos. 3,932,736; 4,340,937; 4,463,430; 4,671,757; 4,678,424; and 4,700,310. The importance of controlling moisture in the pelleting process is emphasized in many of these prior automatic control systems and has been approached from different perspectives. For example, in the earliest patent, U.S. Pat. No. 3,932,736, it was desired to control the moisture content by utilizing temperature measurements taken as the mash traversed the conditioner or input section to the pellet mill. A later patent, U.S. Pat. No. 4,340,937, provided another control mode which utilized a temperature differential taken across the die or pellet producing section of the pellet mill. Still, a later patent, U.S. Pat. No. 4,742,463, provided a control whereby the temperature of the finished pellet immediately as it is formed is taken and is used to control the input of moisture and heat in an effort to achieve finished pellets having a desired moisture content. As can be appreciated, much work has been expended by the inventor herein in developing controllers for pellet mills which desirably control the input of moisture and heat to achieve finished pellets having a desired moisture content. In all of these systems, steam is a major ingredient in the process and is dealt with rather effectively, but in different manners depending upon the desired control mode and source for steam.

Despite the tremendous success which the inventor has experienced in developing and commercializing these prior patented automatic controllers, the inventor has continued his efforts at improving the automation of the pelleting process. One of the problems inherent in utilizing steam in the pelleting process is that it is very difficult to accurately measure the moisture content of the steam. Of course, the moisture content can depend not only upon the temperature of the steam, but also upon the pressure of the steam. Furthermore, it is rather expensive in a typical pellet mill installation to provide a boiler capable of producing the large amounts of steam required as an ingredient in the pelleting process. When steam is used as an ingredient, the system is an open loop system which means that steam does not return to the boiler or other steam source for recycling. Therefore, large amounts of energy are utilized in producing the large quantities of steam required when steam is an ingredient in the pelleting process.

In an effort to partially address the inherent process control problems in pelleting when utilizing steam, there has been developed a steam or vapor generator device which utilizes a burner placed directly in contact with water to produce steam at a desired super heated temperature and desired moisture level on a continuous flow basis. The inventor herein has succeeded in adapting that steam vapor generator for use with a pellet mill and automatically controlling it therewith as shown in U.S. Pat. No. 4,700,310. Still other control schemes for the steam vapor generator when used with a pellet mill are pending. However, the steam vapor generator merely represents a more controllable source for steam and does not alleviate the inherent problems in utilizing steam in the pelleting process. As mentioned above, utilizing steam still represents an inherent loss in control due to the relative difficulty in accurately measuring the moisture content of steam and controlling its production and introduction into the pellet mill. Furthermore, when steam is used as an ingredient, large quantities of steam must be produced for consumption which can be quite expensive not only in the cost of capital equipment but also in the energy costs for producing pellets.

To solve these and other drawbacks inherent in the pelleting process which utilizes steam as an ingredient, the inventor herein has succeeded in developing a new approach to pelleting which utilizes moisture in its liquid phase, i.e. water, and heat in the form of hot air, but no steam in converting the dry material into a mash suitable for pelleting. This represents a complete departure from the prior art where the prevailing thinking is that steam is a necessary ingredient in the pelleting process. Instead of steam, the water is heated to approximately 200° F. and sprayed on the dry material in the conditioner, and air heated to a nominal 275° F. is blown through the conditioner at positive air pressure to heat the mash. The source for the heated air generally comprises a blower mounted in an air duct which also contains a number of heaters such that the blower pressurizes the air through the heaters and into a plenum which interconnects the air duct to the conditioner. For convenience, and as the typical pellet mill installation does include a boiler for other purposes, the heaters in the air ducts may be steam driven heat exchangers, much like radiators found in steam heating systems in commercial building. However, as in typical commercial heating systems, the radiators are in a closed loop system such that after the steam traverses the heat exchanger, it is returned to the boiler and reused. This is much more energy efficient and greatly reduces the required capacity for the boiler over that in a typical prior art pellet mill installation where steam is utilized as an ingredient of the mash itself.

With the pellet mill process as disclosed and claimed herein, the amounts of moisture added to the dry material may be very accurately determined and, when factored appropriately to account for losses, may be very accurately matched to the rate of flow of dry material to produce finished pellets having a desired percentage moisture content. This also provides the advantage of separating the temperature input from moisture input such that they may be individually adjusted independently of each other whereas with steam, an increase in the amount of steam increases both moisture and temperature and vice versa. Therefore, the temperature parameter may be optimized to satisfy other considerations in pelleting, such as die life, or sterilization of the mash, proper cooking temperature, etc.

In some pellet mill installations, it may desirable to continue to utilize steam and rely on the hot air injection system of the present invention as a source of dry heat. As shown in the inventor's prior patent No. 4,671,757, there is a need in pelleting to provide dry heat to the mash to elevate its temperature to ensure recommended cooking or gelatinization of the feed prior to its pelleting. With some materials, such as wet grain or the like, there may already be a significant amount of moisture present such that increasing the temperature by adding steam may be undesirable as it overmoisturizes the feed. Some materials desired to be pelleted contain enough moisture that they may be directly fed into the pellet mill without the addition of any supplemental moisture. In these instances, the moisture supply means can be considered as the same structure which inputs the material to the pellet mill conditioner. In the prior art, steam jackets were often provided surrounding the conditioner and steam was pumped into these jackets to impart heat into the conditioner by radiating heat from the sidewalls thereof. As explained more fully in the prior patent mentioned above, this type of installation suffers from many drawbacks. Therefore, the hot air injection system of the present invention offers a desirable alternative for pumping dry heat into the mash. This dry heat system may thus be used with pellet mill installations incorporating steam, hot water, molasses, and other types of liquids and be thus desirable. However, the inventor believes that optimal advantage of the hot air injection system of the present invention is attained through use thereof without steam in a pellet mill installation for the reasons more fully explained herein.

While the principal advantages and features of the present invention have been described above, a fuller understanding may be obtained by referring to the drawing and description of the preferred embodiment which follow.

BRIEF DESCRIPTION OF THE DRAWING

The drawing depicts the pellet mill including a conditioner section with a hot air system interconnected to the conditioner for injecting heat therein.

DETAILED DESCRIPTION OF THE PREFERRED EMBODIMENT

As shown in the figure, a pellet mill of the present invention includes a pellet producing section 22 which generally includes a rotating die and rollers (not shown) driven by a main motor 24. Mash is mixed in the conditioner section 26 and formed from dry material 28 stored in a storage bin 30 atop a screw feeder 32 having a worm gear or screw 34 for controllably feeding a desired rate of flow of dry material to the input of the conditioner 26. Moisture in the form of heated water is provided by a water system 36 which includes a water pressure regulator 38, a flow meter 40, a modulator valve 42 to control the rate of flow of water through the water system 36, an on/off solenoid valve 44, and a water heater 46. Water is injected into the conditioner 26 through one or more spray nozzles 48.

Heat is input to the conditioner 26 through a hot air system 50 which includes an air intake 52 which feeds air to a positive displacement blower 54 driven by motor 56 and controlled by a variable frequency controller 58. The air drawn into air intake 52 may be surrounding ambient air or air which has had its moisture removed, such as by dehumidifying or the like. An air duct 60 contains a pair of heat exchangers which may be steam driven and which impart a controlled amount of heat to the air. If steam driven, the same boiler (not shown) may be utilized to supply the necessary steam as can be used to supply the heat to hot water heater 46. The air duct 60 connects to a plenum 64 with a plurality of holes extending through its sidewall and into the conditioner 26 so that a quantity of air may be blown by blower 54 through air duct 60, heated by heat exchangers 62 and injected into conditioner 26 through plenum 64 to thereby heat the dry material as it is converted into mash. As an alternate embodiment, the flow of air through air duct 60, and thus the amount of heat added to the mash, may also be controlled by a butterfly valve 66 whose position is adjusted by a control 68 to mechanically limit the flow of air within the air duct 60.

An automatic pellet mill controller 70 may monitor the temperature of the mash with one or more temperature sensors 72, 74 as has been previously disclosed and claimed by the inventor herein in his prior patents. For example, temperature sensor 72 may sense the temperature of the mash just prior to its entering into the pellet producing section 22 of the pellet mill. Additionally, temperature sensor 74 may sense the temperature of the mash just as it emerges from the plurality of holes in the die and is formed into pellets as is disclosed and claimed in one of the inventor's prior patents mentioned above, incorporated herein by reference. Additionally, the automatic controller 70 controls the water system 36 and the air system 50 to control the input of moisture and heat into the conditioner 26 in accordance with one or more of the various control algorithms of the inventor's prior patented systems. One such method might be a simple ratioing between the rate of flow of water through the water system 36 and the rate of flow of dry material 28 through the conditioner 26.

The control of the heated air system 50 can include controlling the speed of, the blower motor 56 by controlling its variable frequency controller 58. Alternately, the temperature of the air may be reduced or increased by controlling the heat exchangers 62. As still another option, the butterfly control valve 66 may be controlled to also limit the quantity of air flowing through the duct 60 and into the conditioner 26. As another option, a vent 76 may be provided in the conditioner to help ensure that the heated air produced by the air system 50 completely traverses the conditioner to provide a full and even heating to the mash as it is mixed in the conditioner 26. Steam may also be provided to the mash through a steam plenum 77 for those installations in which the use of steam is desired.

As an alternative to the arrangement shown in the drawing, a counterflow arrangement may be utilized whereby the heated air is injected at or near the spout connecting the conditioner 26 with the pellet producing section 22, and the vent 76 may be located near the input end of conditioner 26. In this arrangement, the dry material and moisture travel in a direction counter to the direction of flow of heated air produced by the hot air system 50. In some installations, and under some circumstances, this counterflow may provide a more desirable arrangement for heating the mash prior to its entry into the pellet producing section 22.

In a typical control mode, it will be desired to know the temperature of the heated air traversing the air duct 60 and, for such purpose, a temperature sensor 78 is mounted in duct 60 to sense the temperature of the air after it traverses the heat exchanger 62. This feedback provides information which is desirably used by the pellet mill controller 70 to control the amount of heat input to the conditioner 26 and mash.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a pellet mill for mixing dry material and moisture into a mash and forming pellets therefrom, the pellet mill including a conditioner means for mixing moisture and dry material into a mash and a pellet producing means for forming pellets from the mash, the improvement comprising means for supplying heat to the conditioner means which is substantially moisture free as the principal source of heat for the pelleting process, and a separate means for supplying moisture substantially in its liquid phase only to the conditioning means.

2. The device of claim 1 wherein the heat supply means includes means for forcing heated air into the conditioner means.

3. The device of claim 2 further comprising means for heating the moisture prior to its entry into the conditioning means.

4. The device of claim 3 wherein the heat supply means includes an air blower, a heater means for supplying heat to the air prior to its entry into the conditioning means, said air blower and heater means being mounted in an air duct, and a plenum interconnecting the air duct to the conditioning means.

5. The device of claim 4 further comprising an automatic controller for said pellet mill, said controller including means for measuring the temperature of the mash, and means for controlling the heat supply means in response thereto.

6. An automatic control and heat source for a pellet mill, said heat source comprising means for injecting heat into said pellet mill with substantially no moisture as the principal source of heat for the pelleting process, said pellet mill having a separate moisture supply means, said heat source including an air duct connected to and communicating with said pellet mill, means for pressurizing air into said air duct, and means for heating the air passing through said air duct, the control having means for varying the heat injected into the pellet mill by the heat source.

7. The device of claim 6 wherein the pellet mill includes a conditioning means, the air duct being connected to and communicating with said conditioning means, means for feeding a supply of dry material to the conditioning means, and wherein the moisture supply means includes means for supplying moisture to the conditioning means, said conditioning means having means for mixing said dry material and moisture into a mash, the pellet mill further including a pellet producing means for forming said mash into pellets, and wherein the control includes means for sensing the temperature of the mash and controlling the heat source in response thereto.

8. The device of claim 7 wherein the control further comprises means to control the air pressurizing means to thereby control the amount of heat supplied to the pellet mill.

9. The device of claim 7 wherein the control further comprises means to control the air heating means to thereby control the amount of heat supplied to the pellet mill.

10. The device of claim 7 wherein the control further comprises means to control the flow of air through the air duct to thereby control the amount of heat supplied to the pellet mill.

* * * * *